(12) United States Patent
Hosford (10) Patent No.: US 7,785,479 B1
(45) Date of Patent: Aug. 31, 2010

(54) APPARATUS AND METHOD OF SEPARATING

(76) Inventor: Michael Hays Hosford, 1412 Crescent Ave., Klamath Falls, OR (US) 97601

( * ) Notice: Subject to any disclaimer, the term of this patent is extended or adjusted under 35 U.S.C. 154(b) by 0 days.

(21) Appl. No.: 12/586,664

(22) Filed: Sep. 25, 2009

Related U.S. Application Data (63) Continuation-in-part of application No. 12/150,881, filed on Apr. 30, 2008, now abandoned.

(60) Provisional application No. 60/926,941, filed on May 1, 2007.

(51) Int. Cl.
*B01D 21/24* (2006.01)
*B01D 21/26* (2006.01)

(52) U.S. Cl. .................. 210/786; 210/787; 210/794; 210/801; 210/803; 210/807

(58) Field of Classification Search .............. None
See application file for complete search history.

(56) References Cited

U.S. PATENT DOCUMENTS

| | | | |
|---|---|---|---|
| 4,666,687 A * | 5/1987 | Chantriaux et al. ......... 423/127 |
| 4,762,684 A * | 8/1988 | Chantriaux et al. ......... 422/106 |
| 2002/0046968 A1 * | 4/2002 | Hartleitner et al. .......... 210/388 |
| 2002/0070157 A1 * | 6/2002 | Yamada .................... 210/321.8 |
| 2003/0178359 A1 * | 9/2003 | Posselt ....................... 210/408 |
| 2004/0050805 A1 * | 3/2004 | Hartleitner et al. .......... 210/800 |
| 2004/0206710 A1 * | 10/2004 | Yamada et al. .............. 210/792 |
| 2005/0189281 A1 * | 9/2005 | Timmons .................... 210/286 |
| 2008/0110828 A1 * | 5/2008 | Yerushalmi et al. ......... 210/620 |
| 2008/0308502 A1 * | 12/2008 | Jameson ..................... 210/703 |
| 2009/0236287 A1 * | 9/2009 | Vero et al. .................. 210/663 |
| 2009/0242487 A1 * | 10/2009 | Vero et al. .................. 210/661 |

* cited by examiner

*Primary Examiner*—Robert James Popovics

(57) ABSTRACT

The present invention advances tank-based aquaculture by providing a low cost, high efficiency solid waste separator. The invention combines the simplicity of centrifugal-gravitational separation with the practicality of automatic separator cleaning. Low-pressure air from a blower or air pump induces water flow through the separator. The compressed air source is also used to purge accumulated sludge from the separator and to scour internal separator surfaces. Installation of a captive floating granular media bed within the separator further stabilizes the centrifugal flow pattern, enhances the scouring action during sludge flushing events, and provides substrate for nitrifying bacteria colonization. Separator purging and scouring processes are simply and easily automated with small, low-voltage electric valves and timers. Operational cost-savings are magnified in multiple tank systems where multiple separators are operated by a centralized compressed air system and controller.

6 Claims, 4 Drawing Sheets

APPARATUS AND METHOD OF SEPARATING

CROSS-REFERENCE TO RELATED APPLICATIONS

This application is a continuation-in-part of Ser. No. 12/150,881, filed on Apr. 30, 2008, now abandoned titled Apparatus For and Method Of Separating, which claims priority from the provisional patent application Ser. No. 60/926,941, filed May 1, 2007, titled Vortex Settling Cone with Pneumatic Sludge Ejection for Separating and Removing Solid Particles from a Liquid Flow Stream.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention has immediate application to the aquaculture industry, and more particularly to an apparatus and method for mechanically separating solid waste particles from a liquid stream and automatically ejecting them from the liquid environment. This invention has immediate application to commercial aquaculture and aquatic research. It may find application in other fields, including but not limited to general wastewater treatment and landscaping industries.

AQUACULTURE is the science, art, and business of cultivating marine or freshwater aquatic organisms, and is one of the fastest growing sectors of United States agriculture. Most of this growth is in the intensive fish culture sector, where wastewater is renewed by solid waste separation and other treatments before being recycled back to the culture system. These intensive recycle systems are conservative in terms of water use and land area requirements, and are often housed for further environmental control. Such intensification has allowed for aquaculture expansion into geographical areas having low water yields and marginally adequate climate and source-water temperature.

Intensive aquaculture wastewater contains high concentrations of particles in the form of fecal material and uneaten food and dissolved nitrogenous waste in the form of ammonia, nitrite, and nitrate. The concentration of these pollutants must be substantially reduced prior to water re-use or discharge into the environment. The specific gravity of fish fecal material ranges from 1.05 to 1.20, and wasted feed is considerably denser. Since particle densities exceed that of water, they settle from the water column under low velocity conditions.

Intensive recycle aquaculture systems typically employ multiple cylindrical tanks with diameters ranging from 5 to 50 feet, and depths from 2 to 5 feet. The major advantage of cylindrical tanks as applied in fish culture is that they are virtually self-cleaning. Water flowing into the fish tanks is directed tangentially to the tank wall at the tank outer radius. With proper water inflow structure and flow velocity, solid waste particles settle by centrifugal and gravitational forces to the bottom-center of the tank. The movement of fish within the tanks enhances the migration of settled particles toward the tank center. The congregated particles are continuously drawn through a bottom-center drain to separation systems prior to recycle or discharge to the environment.

Centrifugal-gravitational solid waste removal studies on fish culture tanks have shown that tanks having diameter-to-depth ratios greater than 10:1 do not self-clean well. Since tank depths greater than five feet are not commonly used for aquaculture, tank diameters rarely exceed 50 feet, and are typically 30 feet or less. The use of many smaller tanks offers advantages over the use of a few larger tanks. If one small tank system fails due to equipment failure or disease outbreak, the percent of the loss is less than in the case of a large tank failure. The assumption here is that each fish tank has its own dedicated solid waste separation circuit, hydraulically separate from other tanks.

A recent advance in fish tank technology is the "dual flow," or "double drain," system. Dual flow fish tanks have two water treatment circuits, one for solid waste separation and one for dissolved nitrogenous waste conversion. Nitrogenous waste conversion reactors are often referred to in the aquaculture industry as nitrification reactors.

Dual flow fish tank technology has drawn attention to the need for compact solid waste settling separators. A dual flow system is comprised of a low-flow recycle circuit (around 20% of the total system water volume per hour) through the bottom-center drain for solid waste removal and a high flow recycle circuit (around 80% of the total system water volume per hour) through a tank sidewall port for dissolved nitrogenous waste processing in a nitrification bioreactor. Nitrogenous waste production dictates the flow rate required through the bioreactor. The main revelation of the dual flow concept is that by un-coupling the solid waste circuit from the bioreactor circuit, the solid waste separator can be physically downsized, and can operate at a very low water flow rate. This indicates the usefulness of gravitational separators for solid waste removal that are capable of handling high particulate concentrations at low flow rates.

In high-density aquaculture systems that treat water for system reuse, solid wastes accumulating in gravitational separators or filters will cause water quality deterioration if the accumulated waste is not removed frequently. Over time, captured or settled particles can re-enter the flow stream, resulting in an accumulation of suspended particles and dissolved organics in the culture system. This occurs by several mechanisms, including shear forces in pressurized screen or media filters and by bacterial action. Toxic gases including carbon dioxide and hydrogen sulfide are produced in sludge-laden filters and gravitational settlers. Buoyancy created by these gases can cause re-suspension of settled particles. Stagnant zones of sludge can harbor fish parasites and pathogens. For these reasons, it is widely recognized that solid waste should be removed from solid waste accumulators as frequently and as thoroughly as possible. In the case of gravitational separators, cleaning and sludge removal is accomplished by backwashing, draining, and/or manual washing of internal vessel surfaces.

THE PRIOR ART includes swirl separators, hydro-cyclones, deceleration basins, and off-line settling cones. Cylindrical settling separators separate waste particles from flow streams by the same means as cylindrical fish tanks, namely, centrifugal-gravitational forces. In aquaculture applications, these units typically remove particles eighty microns in diameter and larger, representing 80% of the total particulate loading. This is satisfactory for some fish species, and for most species raised in systems using high water dilution rates. Prior art settling separators are non-pressurized, meaning that the water surface in the separator is at atmospheric pressure. Vessel geometry imperfections result in a certain degree of distortion of the centrifugal flow pattern. The distortions can manifest as errant water currents that can entrain lower-density particles and prevent them from settling. Some other solid waste accumulators typically used for aquaculture recycle systems, including up-flow bead filters (pressurized) and micro-screen filters (non-pressurized), can remove particles of 30 micron diameter and larger, but are relatively expensive to buy, install, and/or operate. Foam fractionators (flotation devices) are often used in conjunction with particle settling devices to remove finer particles (100 micron diameter and less), dissolved organics, and surfactants from aquaculture systems. Use of effective settling separators with foam fractionators successfully removes all particle sizes from aquaculture systems.

Centrifugal-gravitational particle settler hydraulic loading rates range from three to 5 gallons per minute per square foot of horizontal separator area. For a given particle size and density, removal efficiency is a function of separator vessel geometry, resulting flow dynamics, and hydraulic loading rates. Cylindrical centrifugal separators are more effective than longitudinal-flow basins, which have hydraulic loading rates of about 1 gallon per minute per square foot. This means that they take up four times the floor space as centrifugal-gravitational settlers.

In intensive recycle systems, fish tank water is typically recycled at a rate of one tank volume per hour. For a thirty-foot fish tank of 4-foot depth, with 20% of the recycle flow passing through the solid waste separator, the flow through the solids separator would be about 50 gallons per minute (gpm). For a centrifugal-gravitational settling separator operating at a hydraulic loading rate of 5 gpm per square foot of horizontal separator area, the separator would be only four feet in diameter and use 12.6 square feet of floor space. A comparable rectangular settling basin would have a footprint of 50 square feet.

Manual cleaning of sludge accumulation in settling basins and cones involves opening drain valves and wiping cone sidewalls. Automation of large sludge drain valves is expensive, and forceful flushing can only occur if there is adequate head pressure. This can be a disadvantage on flat sites.

The prior art review reveals the need for a low cost, high efficiency particle separator that offers the simplicity of a centrifugal-gravitational settling cone and an automated system for frequent ejection accumulated sludge and for cleaning internal separator surfaces. Such a device will lend itself well to multi-tank systems, each tank having its own separator, but with the full system operated by a single centralized compressed air system with automated sludge ejection control. This application offers savings on equipment, maintenance, labor, and electrical costs.

BRIEF SUMMARY OF THE INVENTION

The present invention advances tank-based aquaculture by providing a simple, low cost, high efficiency solid waste separator. The invention combines the simplicity of centrifugal-gravitational separation with the practicality of automatic separator cleaning. Low-pressure air from a blower or air pump induces water flow through the separator. The compressed air source is also used to purge accumulated sludge from the separator and to scour internal separator surfaces. Scouring is enhanced with addition of floating granular media, which also provides surface area for nitrifying bacteria. Separator purging and cleaning processes are automated with an electric solenoid valve and a repeat-cycle timer controller. Operational cost-savings are magnified in multiple tank systems where multiple separators are operated by a centralized compressed air system and controller. The automated separator flush control system can also be used to operate automatic vibratory fish feeders to further economic advantage and create self-sustaining aquatic life support systems.

The present invention provides a system and method for separating solid particles from a liquid environment and automatically purging the settled particles from said fluid environment. The system includes a device having a tank with a substantially cylindrical middle and upper portion, a substantially conical lower portion, and a removable leak-proof top lid. For automatic sludge purging, the device also includes a fluid inlet check valve, a fluid overflow sludge discharge port, and a compressed air inlet. The fluid inflow with a suspension of solids is introduced through a fluid inlet port located at the lower part of the cylindrical portion of the tank, and is directed horizontally at an angle tangent to the tank's inner wall. Solid particles in the fluid stream settle by centrifugal and gravitational forces into the conical lower portion of the vessel. The solids-free fluid flows upward through the cylindrical portion of the tank to the separated fluid outlet port located in the upper part of the cylindrical portion of the tank. The velocity of the ascending fluid is less than the settling velocity of the solids, thereby resulting in the separation of the solids from the fluid flow stream. Centrifugal forces imparted to the separator inflow enhance particle settling tendencies. In the preferred embodiment of the invention, block media or floating granular media is placed in the upper portion of the cylindrical tank section to (a) stabilize the centrifugal flow pattern, (b) prevent the formation of errant liquid currents that interfere with fine particle settling, and (c) provide substrate for nitrifying bacteria attachment and colony formation. When compressed air is applied to the air inlet port, internal vessel pressure exceeds hydrostatic pressure and the liquid inlet check valve closes. The compressed air displaces water from the separator, forcing the accumulated sludge from the conical lower portion of the vessel out the overflow sludge discharge port. If a floating granular media bed is present, the incoming air shuffles the media and shakes out any solids that accumulated in the media bed during separation. When compressed airflow to the tank is terminated, hydrostatic pressure exceeds tank pressure. The air in the tank bleeds out through a small-orifice port located in the separator lid, and liquid entry at the inlet port resumes at a rate volumetrically equal to the air escape rate. When the liquid level rises to the level of the liquid outlet port, liquid flow resumes out of the tank.

The present invention provides an economical device and method for separating solid particles from a fluid environment without appreciable pressure loss across the device. It also provides a mechanism and method for ejecting solids from the liquid environment.

It is an object of this invention to provide a cylindrical separator tank with removable, watertight lid wherein gravitational particle settling is enhanced by centrifugal forces.

It is another object of this invention to provide a conical base below the centrifuge cylinder for sludge collection and concentration.

It is another object of this invention to provide a mechanism and method for high volume ejection of settled sludge from the collection cone using compressed air and minimal water loss, with the discharge flow rate controlled by a throttling valve in the compressed air delivery line.

It is another object of this invention to provide a mechanism and method to stop the inflow and outflow water streams during the sludge ejection process.

It is another object of this invention to provide a mechanism and method for maintaining pressure in the sludge ejection line.

It is another object of this invention to provide a mechanism and method for complete evacuation of liquid from the separator.

It is another object of this invention to provide a mechanism and method for controlling the liquid re-fill rate following a sludge ejection event.

It is another object of this invention to provide a mechanism and method for producing a high velocity re-fill rate following a sludge ejection event.

It is another object of this invention to provide a simple mechanism for automating the compressed air sludge ejection device, with complete control over ejection event duration and frequency.

It is another object of this invention to provide automation for fish feeding mechanisms. The feeders are energized on the same electrical circuit as the sludge ejection.

It is another object of this invention to provide a method whereby multiple separators can be operated and cleaned automatically using a centralized compressed air system and a single repeat-cycle timer.

It is another object of this invention to improve solids separation by incorporating permeable media, either rigid or granular-floating, to stabilize the centrifugal flow pattern below the media, to prevent the formation of short-circuiting water currents that would otherwise sweep smaller particles through the separator, and to create a uniform low-velocity laminar upward flow through the media-bearing portion of the separator.

It is another object of this invention to provide a mechanism and method of cleaning sludge from sludge collection surfaces using high velocity gravity-driven drainage.

It is another object of this invention to provide a mechanism and method of scouring sludge from sludge collection surfaces using said high velocity liquid re-fill as well as said drain flow to entrain said granular floating media so that the media granules scour the internal surfaces of the separator.

It is another object of this invention to provide media (rigid or loose-floating) surface area for ammonia- and nitrite-oxidizing bacteria.

It is another object of this invention to provide a method of shuffling said granular floating media to shake out trapped solids.

While the invention has been described in connection with specific embodiments thereof, it will be understood that it is capable of further modification. For example, the size of the various components of the invention 1 may be modified to accommodate various applications. Furthermore, this application is intended to cover any variations, uses, or adaptations of the invention, including such departures from the present disclosure as come within known or customary practice in the art to which the invention pertains, and as fall within the scope of the appended claims.

DETAILED DESCRIPTION OF THE INVENTION

In the drawings many details pertaining to fabrication and maintenance utility well-established in the machine construction art and not bearing upon points of novelty are omitted in the interest of descriptive clarity and efficiency.

Figure 1:
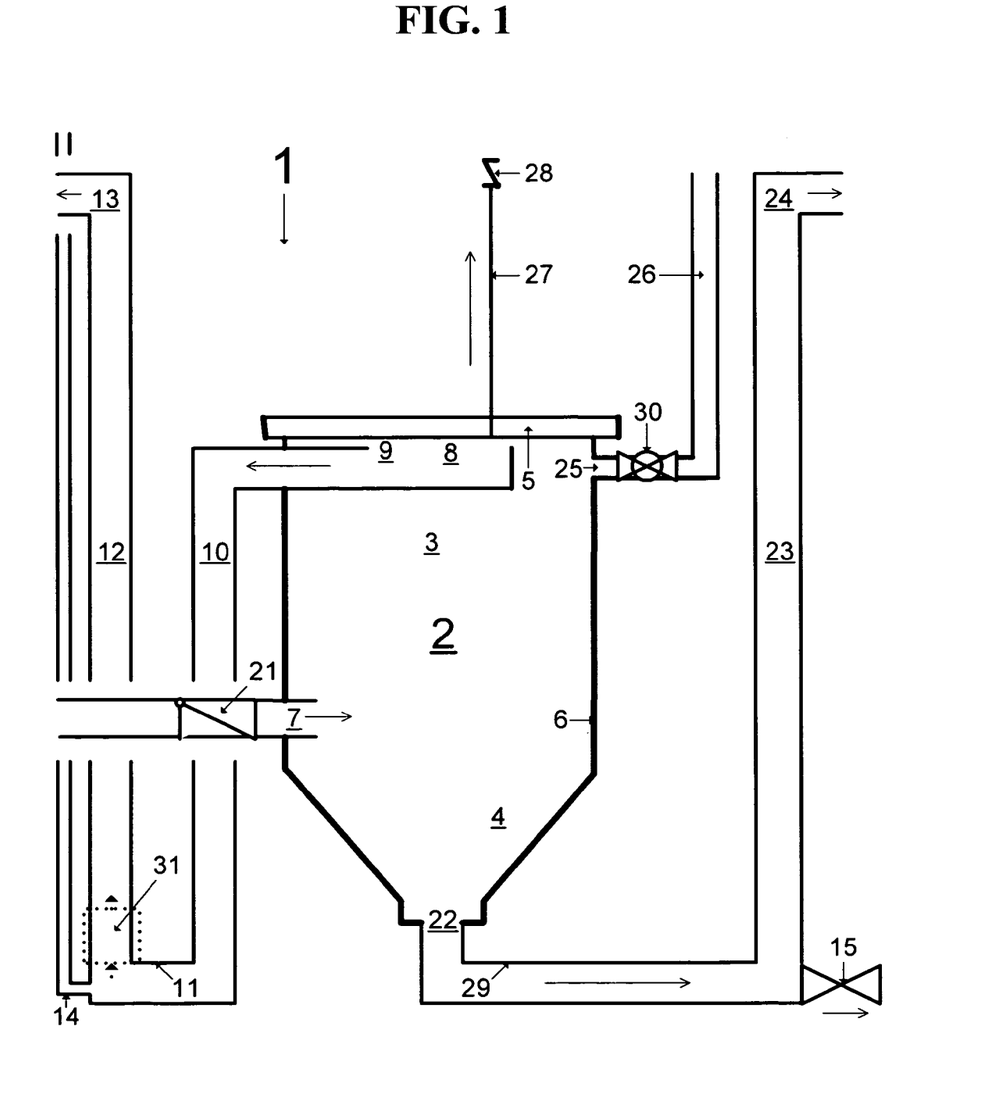
FIG. 1 is a schematic flow diagram of the basic embodiment of the present invention.

Referring now to the drawings, there is shown in FIG. 1 an invention, a solid waste particle separating system 1, for treatment of liquid, and more specifically for separation of a solid particle suspension from a liquid flow stream and periodic ejection of the accumulated particles from the liquid environment. The primary separation force of this invention 1 is gravity. Therefore, said particles have a specific gravity greater than the liquid they are suspended in. The invention 1 includes a tank 2 having a removable, gasketed, leak-proof top lid 5, a substantially cylindrical upper portion 3, and a substantially conical lower portion 4. The cylindrical upper portion 3 comprises the particle separation zone, accomplished by centrifugal and gravitational forces. The conical lower portion 4 is configured to collect particles that have been separated from the liquid environment. Such settled particles are referred to throughout this description as "sludge." The tank 2 can be made of any non-porous, rigid material. The removable, gasketed, leak-proof lid 5 can take any form, and can be readily manufactured by those skilled in the art.

The tank 2 provides a liquid inlet 7 through which the liquid along with the suspension of particles may be introduced into the lower section of the cylindrical portion 3. The separated liquid exits the tank 2 at the liquid outlet port 8 located near the separator lid 5. Upward flowing liquid velocity is less than the settling velocity of the solid particles entrained in the liquid, so they tend to settle by gravitational forces to the bottom of the cone 4. The liquid inlet 7 is configured to induce a substantially uniform cyclonic flow pattern to the liquid introduced therein. In particular, as liquid is introduced into the cylindrical portion 3, the liquid is directed along the cylinder wall 6, causing the liquid to flow at a substantially uniform velocity tangentially along the lower portion of the cylinder wall 6. To this end, the liquid inlet 7 is designed for continuous and unobstructed liquid flow along the cylinder wall 6. Centrifugal acceleration resulting from the circular flow pattern creates a slight pressure increase along the cylinder wall 6. This creates a pressure gradient from the outer edge of the tank to the center, resulting in a flow inward along the bottom of the tank. This inward flow draws particles to the low turbulence zone in the center of the conical base 4. In this way, gravitational particle settling is enhanced by centrifugal acceleration.

Particle Separation Phase of Operation

In this phase of the separating operation, liquid flow is induced through the tank 2 by a pressure differential across the check valve 21. When the pressure at the inlet of the check valve 21 is higher than the pressure at the outlet of the check valve 21, liquid will be caused to flow through the tank 2 through the liquid inlet 7. When the reverse is true, the check valve 21 is closed and the liquid in the tank 2 is isolated from the source liquid. A pressure increase at the check valve 21 inlet resulting in liquid flow through the tank 2 can be created by pumps, hydrostatic head pressure, or any other means. Check valve 28 allows for continued flow through the tank in the event that tank 2 pressure at elevation 9 drops below atmospheric pressure due to source water pressure reduction or increased flow resistance.

Pneumatic Ejection of Accumulated Sludge

Accumulated sludge is ejected from the bottom of the conical base 4. Compressed air 26 is applied to the air inlet 25 by opening air valve 30 via manual or electronic means. If a liquid pump is present at location 30, it is stopped at the same time that the air valve 30 is opened. As tank 2 pressure exceeds hydrostatic pressure by the action of the compressed air 26, pressure on the exit side of the liquid inlet check valve 21 exceeds entry side pressure and the check valve 21 is caused to close. Compressed air enters the tank 2 and displaces liquid out of the tank 2 through the liquid outlet 8 and the sludge discharge port 22. Liquid flow out of the liquid outlet 8 ceases once the tank 2 liquid level drops below the liquid outlet overflow elevation 9. Once the liquid in the tank 2 drops below elevation 9, the sludge accumulated in the conical lower portion 4 of the tank 2 is forced by air pressure exclusively out the sludge discharge port 22, through the sludge discharge standpipe 23, and out the sludge discharge overflow 24. When the air valve 30 is opened and an air space forms in the top of the tank 2, air escapes at a slow rate through the air bleed capillary tube 27. This air escape rate represents a very small portion of the total air applied through the air inlet port 25.

Air pressure applied at the air inlet 25 must exceed total dynamic head pressure in the tank 2 exerted at the liquid inlet 7 in order to shut the check valve 21. Also, the air pressure must be less than the hydrostatic pressure exerted by the liquid in the liquid outlet standpipe 12, defined as the difference between the liquid level in standpipe 12 and the liquid level in the liquid outlet down-pipe 10. This is why any pumping mechanism at the liquid pump location 31 must be rendered inoperative during the pneumatic sludge ejection event. In addition, air pressure applied at the air inlet 25 must be less than the total dynamic head pressure exerted by the sludge discharge overflow 24, which during a sludge discharge event is defined as the sum of (a) the elevation head difference between the liquid in the tank and the sludge discharge overflow 24 and (b) the friction flow resistance from the sludge discharge port 22 to the sludge discharge overflow 24. Typically, the sludge discharge piping is large enough to minimize friction head losses.

Figure 4:
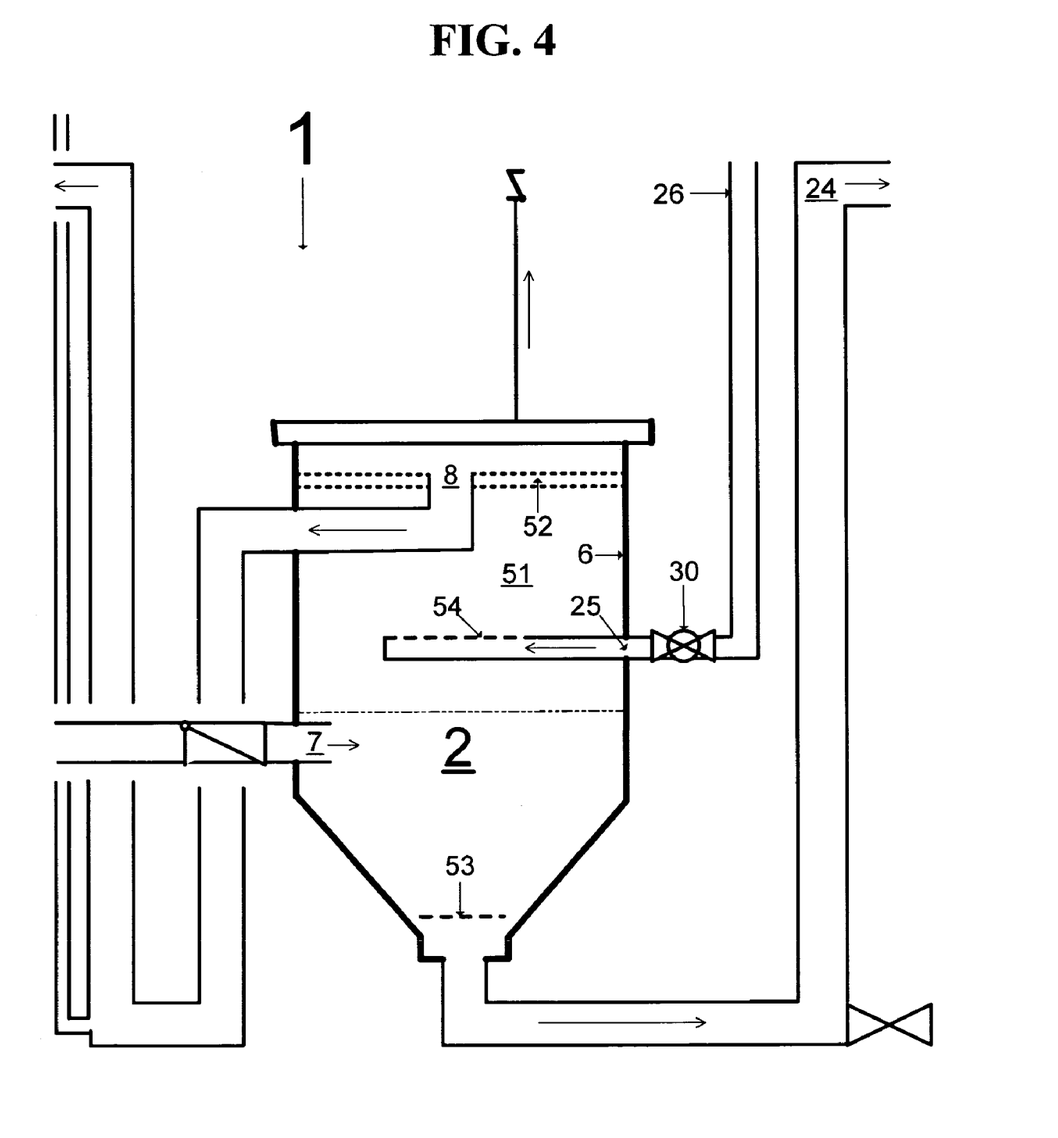
FIG. 4 is a schematic flow diagram of another preferred embodiment of the present invention the using floating granular filter media.

The entire liquid content of the tank 2 can be forced out by the compressed air 26 as long as the pressure requirements described above are preserved. If the liquid is completely evacuated from tank 2, air escapes from the tank 2 through the liquid outlet overflow 13. The air escape causes the pressure in the tank 2 to drop below the hydrostatic pressure exerted at the check valve 21 inlet, and the check valve 21 opens. Liquid flow recommences through the liquid inlet 7 at a rapid rate. Allowing the pressure break to occur has operational advantages because liquid reenters the separator at a rapid rate, generating significant centrifugal acceleration and turbulence in the tank 2. Periodic use of this feature can scour sticky sludge from the tank 2 interior walls. This scouring action is particularly effective where floating granular media 51 is used in the tank 2, as shown in FIG. 4.

Normal Sludge Ejection Operation

In the normal sludge ejection operation, air valve 30 is manually or electronically closed prior to liquid displacement by air at pressure break threshold points 11 and 29. Both the sludge discharge standpipe 23 and the liquid outflow standpipe 12 are made of transparent material, such as commercially available clear polyvinylchloride (PVC). The air valve 30 can be closed once water runs clear in the transparent sludge discharge standpipe 23, indicating that the sludge slug has been evacuated from the conical lower portion 4 of the tank 2. Sludge slug ejection typically requires about twenty seconds of air application. The liquid level in the transparent liquid outlet down-pipe 10 is indicative of the liquid level inside the tank 2. When the liquid level in the liquid outlet down-pipe 10 is observed to drop below the pressure break threshold elevation 11, cessation of liquid flow through the transparent sludge discharge standpipe 23 can also be observed.

Once compressed air injection into the tank 2 through the air inlet 25 ceases, air in the tank 2 slowly bleeds out through the air bleed capillary tube 27. This allows liquid to begin flowing into the tank 2 through the liquid inlet 7 at a volumetric rate equal to the air escape rate through the air bleed capillary tube 27. The air escape rate and the liquid inflow rate are controlled by the capillary tube 27 inside diameter, a reducing orifice in the tube 27, or by a metering valve in the tube 27. A slow liquid inflow rate to the tank is preferred, as it allows a relatively quiescent period where fine particle settling is enhanced. Once the liquid level in the tank 2 reaches the top of the liquid outlet overflow 9, the liquid commences to flood the liquid outlet down-pipe 10 and the liquid outlet standpipe 12. When all the air has been bled from the tank 2, having been completely displaced by the inflowing liquid, the liquid in the overflow pipes 10 and 12, as well as the liquid level in the air bleed capillary tube 27, will be at the level of the system's hydrostatic pressure. The liquid pump at location 31, if present, can then be re-energized and liquid flow through the tank 2 resumed.

High Turbulence Scouring of the Tank Surfaces

The high turbulence scouring of the internal tank surfaces can be accomplished by opening the sludge discharge standpipe bypass valve 15. If present, the liquid pump at location 31 must be shut down for this process. In the preferred embodiment, the liquid in the invention 1, including the tank 2, can be completely drained by opening the bypass valve 15. This means that the bypass valve 15 must discharge to atmosphere, or at an elevation that is lower than the bypass valve 15. Typically, it is most convenient to plumb the sludge discharge overflow line and the bypass valve 15 into the same wastewater discharge pipe. The wastewater would flow to a daylight drain or to further treatment prior to discharge into the environment. The sludge discharge standpipe bypass valve 15 can be opened periodically (once a week or so) by manual or electronic means.

When the sludge discharge standpipe bypass valve 15 is opened, liquid flows through the fluid inlet 7, out the sludge discharge port 22, and through the bypass valve 15 at a rapid rate. The flow is driven by the hydrostatic pressure at the liquid inflow check valve 21 and moderated by frictional head losses through the flow path plumbing. The resulting accelerated liquid flow through the system results in elevated centrifugal acceleration in the tank 2 and increased turbulence in the liquid flow-path plumbing. This high velocity flow regime scours the internal surfaces of the tank 2 and the plumbing, thereby removing sludge that has adhered to the surfaces. Flow velocity can be enhanced further by simultaneously forcing air into the tank 2, by opening the air valve 30 as described in the preceding paragraph. The high-velocity scouring action is further enhanced where granular media 51 is used in the tank 2 as shown in FIG. 4. A transparent window siliconed and bolted into the cylindrical upper portion 3 of the tank 2 can permit viewing of this process. Clear polycarbonate is a good choice for the window.

Airlift Pump

Using an airlift pump at location 31 is the preferred method for inducing water flow through the invention 1. In general, it is preferable to pump liquid out of the tank 2 rather than pump liquid into the tank 2. Pumping into the tank 2 would subject particle-laden liquid entering tank 2 to elevated turbulence. High liquid turbulence can break up certain kinds of solid particles into smaller particles and fines. Small particles and fines are more difficult to settle out than larger particles because they have a lower volume to surface area ratio. This ratio is positively correlated to gravitational/frictional force ratios. Smaller particles are therefore readily dragged along with water currents and are more resistant to gravitational settling. In terms of design and operational parameters, particles that are broken up by a water pump impeller require reduced hydraulic loading rates in order to maintain particle separation and settling efficiency. Airlift pumps are much gentler than impeller-type pumps, and reduces the break-up of large particles into smaller ones.

Figure 2:
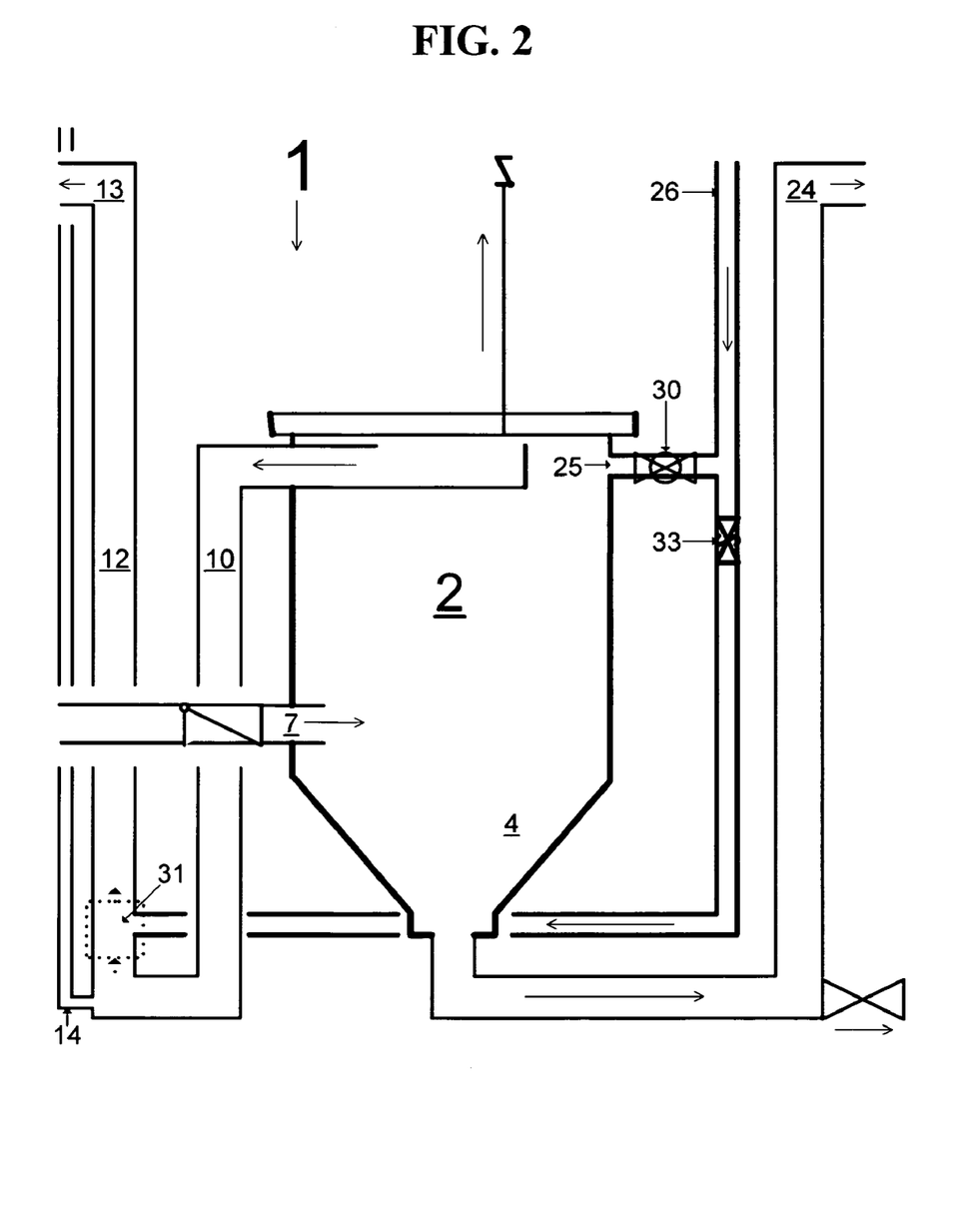
FIG. 2 is a schematic flow diagram of the preferred embodiment of flow induction through the present invention using an airlift pump, and the utility of this embodiment for automation of the sludge ejection process.

FIG. 2 illustrates the use of an airlift pump as a preferred embodiment of the liquid pump at location 31. Air is injected at position 31 through valve 33. Having a much lower density than the surrounding liquid, the air rises through the liquid column in standpipe 12. The air forms bubbles, which entrain liquid as they travel by buoyant forces up the separated liquid standpipe 12 and out the separated liquid overflow 13. For this preferred embodiment, total dynamic pumping head must be kept to a minimum in order to achieve adequate airlift pump efficiency. Specifically, for the solid particle separation function the total dynamic pumping head, expressed as a linear measure, should be no more than thirty percent of the total height of the separated outlet standpipe 12 as measured from the airlift inlet at location 31 to the separated outlet overflow 13. The total dynamic pumping head can be determined by the difference in the liquid level in head tube 14 and the elevation head of the liquid body driving flow by gravity through the invention 1.

In this embodiment, the air valve 30 and the airlift valve 33 are used to re-route compressed air 26 from the airlift at location 31 to the air inlet 25. Where valves 30 and 33 are solenoid valves, tank 2 sludge ejection can be automated using a repeat cycle timer. In the preferred embodiment of the invention 1, valve 33 is a spring-loaded pressure relief valve. In this embodiment, valve 33 is open only while valve 30 is closed. When valve 30 is opened, air flows to the lower pressure region, the tank 2, and the pressure relief valve 33 closes off airflow to the airlift. The preferred embodiment for automation, then, is for valve 30 to be a normally closed solenoid valve. Herein lies a major advantage of the present invention 1. A single air compressor and timer can operate a multiplicity of particle separators 1. In this arrangement, sludge ejection through the sludge discharge overflow 24 would occur simultaneously in all particle separators 1 in response to airflow directed to the separators 1 by a common solenoid valve.

A Representative System

As an example, the invention 1 might be a 15-gallon tank 2, with a horizontal cross-sectional area of one square foot, separating water from a 12-foot diameter fish tank that is four feet deep. Fish tank water aeration and airlift pumping is handled by an air blower, which may also serve many other fish tanks and separators simultaneously. The tank 2 hydraulic loading rate is 5 gallons per minute. Blower air is injected at location 31 to airlift water out of the water outlet standpipe 12 into the fish tank. The water level in the fish tank rises, causing fish tank water to flow back by gravity to the separator invention 1 to complete the recycle filtration loop. The airlift pump at location 31 requires 0.5 standard cubic feet of air per minute (scfm). The airlift valve 33 is a spring-loaded pressure relief valve that opens at 1.0 psi.

For sludge ejection, an electric solenoid valve 30 opens on a repeat cycle timer signal allowing air to flow to the low-pressure zone (0.3 psi) at the air inlet 25 at a rate of 2.4 scfm. The low-pressure pathway results in de-pressurization of the spring-loaded airlift check valve 33 causing it to close, thereby disabling the airlift. Simultaneously, the liquid inlet check valve 21 closes due to increased tank 2 pressure. Airflow into the tank 2 displaces sludge and water out of the tank 2 through the sludge overflow standpipe 24. While air is filling the tank 2, air is also escaping out of the capillary air bleed tube 27 at a rate of 0.4 scfm. This represents a net air gain in the tank 2 of 2.0 scfm (2.4-0.4=2.0). Water displacement out of the separator is equal to the net air gain. Since one standard cubic foot of water is equal to 7.48 gallons, sludge is ejected from tank 2 at a rate of 15 gallons per minute. A five-gallon "flush" removes the sludge slug from the conical lower portion 4 of the tank 2, so the repeat cycle timer is set for twenty-second sludge ejection events. For this example system, sludge ejection events are set to repeat every three hours.

After the sludge slug has been ejected from the tank 2, the repeat cycle timer de-energizes the solenoid air valve 30 and the separation airflow mode resumes as follows. The liquid inflow check valve 21 re-opens and water begins to refill the tank 2 at a rate volumetrically equal to the airflow out of the air bleed capillary tube 27. Since the air outflow is 0.4 scfm, the water inflow is also 0.4 scfm, or 3 gallons per minute. At this refill rate the tank 2 will completely refill with water in one minute and 40 seconds. This is a period of quiescence in the tank 2, so even fine particles readily settle to the conical lower portion 4 of the tank 2. When the water reaches the liquid outlet overflow elevation 9, water refills the liquid outlet down-pipe 10 and the liquid outlet standpipe 12, at which time the airlift pump at location 31 becomes active again.

Figure 3:
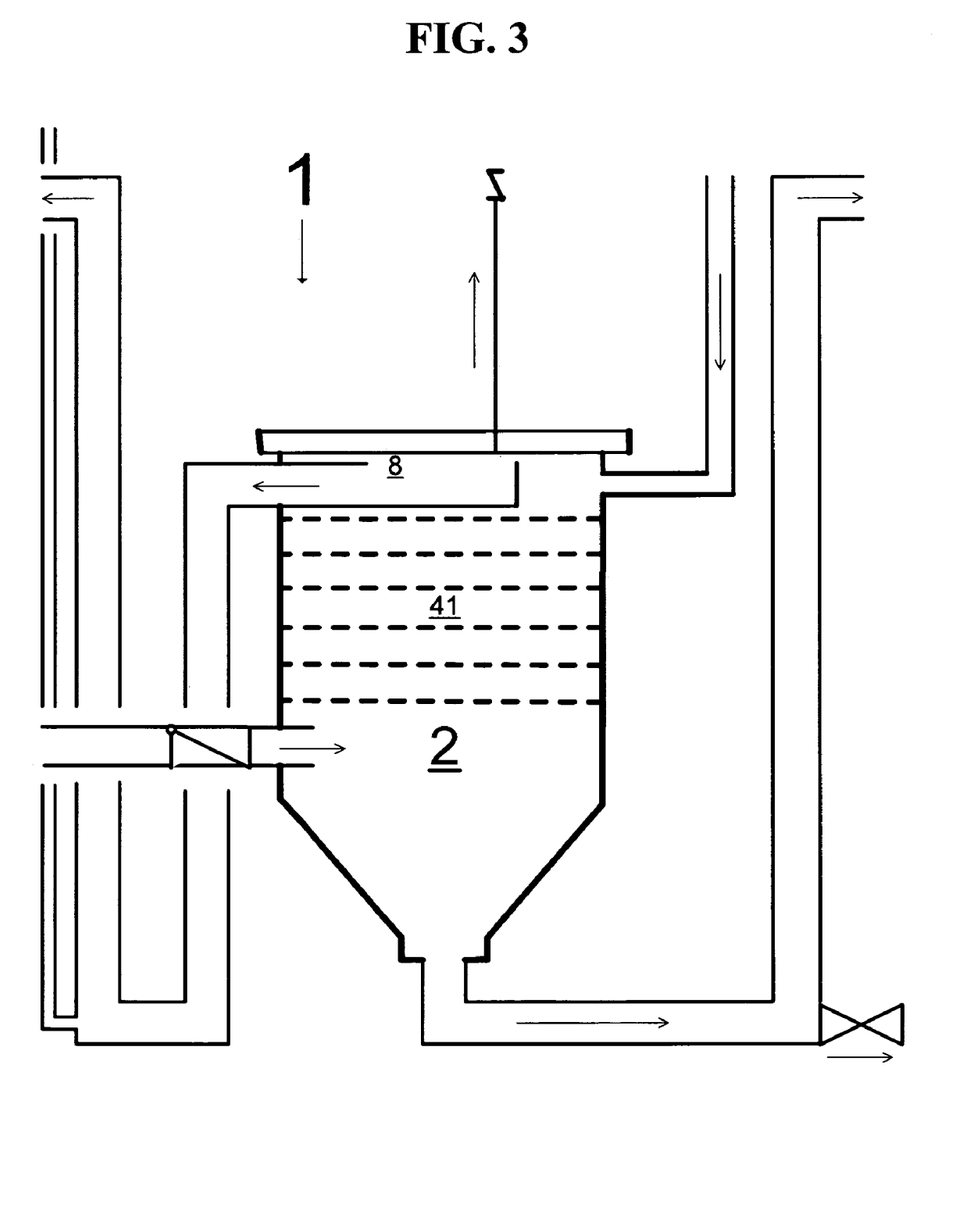
FIG. 3 is a schematic flow diagram of the use of rigid-block filter media in the present invention.

FIG. 3 illustrates the use of rigid block filter media. Cylindrical disks 41 can be cut from block media to fit snugly in the tank 2. The liquid outlet 8 must be removable so that the media disks can be taken out for cleaning or replacement. Installation of media disks 41 as described enhance liquid filtration action by several means, including (a) enhancing the uniformity of the centrifugal flow pattern in the lower cylindrical portion 3 of the tank 2, (b) providing a physical barrier to particle travel into the upper reaches of tank 2, and (c) providing substrate surface area for the growth of nitrifying bacteria. Regarding (c), nitrifying bacteria convert ammonia to nitrate. This function is especially useful where the invention 1 is used in a recirculating fish holding or rearing system. Rigid, porous media filter blocks such as MATALA™ work well for this application. MATALA is available through large aquatic equipment suppliers.

FIG. 4 illustrates the use of floating granular filter media 51. The separation benefits are the same as those of the rigid block filter media described in the preceding paragraph. Use of such media 51 requires installation of containment grates or screens to prevent escape of media 51 from the tank 2. The top screen 52 prevents media 51 from passing out of the tank 2 through the liquid outlet 8. For this preferred embodiment, the liquid outlet 8 is reconfigured as shown, and can be used to support the top screen 52. The screen may be made to fit snugly into the tank 2, and over the liquid outlet 8. A bottom grate 53 must be installed to prevent the media 51 from passing out of the sludge discharge overflow 24. To preclude the need for a screen above the liquid inlet port 7, the granular media 51 should be slightly buoyant in the liquid.

In the preferred embodiment, the air inlet 25 is installed lower on the cylindrical housing wall 6 as shown. An air diffuser 54 extends into the lower portion of the media bed 51. The air diffuser 54 can be as simple as drilled PVC pipe. During a sludge ejection event, compressed air 26 is routed to the air diffuser 54 by opening the air valve 30 and closing the airlift valve 33. As previously discussed, valve operation can be manual or automatic, and the airlift valve 33 can also be a spring loaded pressure relief valve. Air entering the upper portion of the media bed 51 form a rising bubble mass which gently churns the media bed 51 members that are directly above the air diffuser 54. The bottom portion of the media bed 51 is gently agitated by the churning action created in the top portion of the media bed 51 by the force of the rising air bubble mass. This action dislodges particles that adhere to the granular media 51 during separation. The degree of media fluidization depends on the buoyancy of the media with respect to the liquid. As stated, the media should be only slightly buoyant in the liquid.

The use of a granular media bed 51 lends some separation advantages to the present invention 1, including (a) enhanced stabilization of the centrifugal flow pattern in the lower cylindrical portion 3 of the tank 2 (b), internalized media bed 51 cleaning, (c) internalized tank 2 cleaning, and (d) biofilm maintenance. Regarding (b), media 51 agitation by the air diffuser 54 prevents the media bed 51 from fouling and clumping together over time. Regarding (c), the media bed 51 enhances scour cleaning of the conical lower portion 4 of the tank 2 and the bottom grate 53 during sludge ejection operations. Regarding (d) media bed 51 agitation exfoliates dead and aged bacteria and revitalizes the nitrifying bacteria colony growing on the granular media bed 51 surfaces.

Granular media such as KALDNES™ biofilm carrier elements meet the criteria for proper function in the invention 1. The carrier elements are wheel shaped with longitudinal fins at the outside. They are made of polyethylene having a specific gravity of 0.96, which allow easy movement of the carrier material in the completely mixed tanks. The elements measure about 7 mm long and 10 mm in diameter and are designed to provide a large protected surface for the biofilm and optimal conditions for the bacteria culture when the elements are circulated in the water. KALDNES biofilm carrier elements are available through large aquatic equipment suppliers.

Fish Feeding

In automated systems, vibratory fish feeders in the fish tank can be energized at the same time as invention 1 sludge ejection using a signal from a repeat cycle timer which can be the same timer as that for the ejection cycle or a different timer. Manual fish feeding takes time and labor, especially in aquaculture facilities that have many fish tanks. In intensive grow-out systems, adult fish are fed three or 4 times a day, and younger fish are fed even more often. Fecal excretion frequency is on a similar schedule. Vibratory fish feeders use electricity to vibrate a base plate under a feed hopper to shake feed pellets out of the hopper. These units are mounted over fish tanks. The timer-controller units for these feeders cost $150 US and up. Regarding application to the current invention 1, liquid flow from the fish tank to the separator tank 2 is cut to a trickle following each sludge ejection event. Full flow does not resume until the tank 2 re-fills completely, and the time required to do so is controlled by the air escape rate through the air bleed capillary tube 27. So when feed is administered at the same time as a sludge ejection event, the feed pellets are not drawn from the fish tank through the fish tank bottom drain into the separator tank 2. Healthy fish will eat their feed ration within five to 10 minutes, so if the tank 2 refill rate is set to match this interval virtually no feed will be carried to the separator tank 2 and wasted. This is an especially useful feature in culture systems where sinking feed pellets are used. Here again, significant economic advantages are gained where a single compressed air source and repeat cycle timer are used to control multiple separators 1 and vibratory feeders.

Although the immediate application of this invention is commercial aquaculture and aquatic research, it will also find application in other fields including but not limited to wastewater treatment and pond landscaping. The simplicity, scalability, flexibility, and affordability of this technology provide a viable approach to small-scale wastewater and pond water treatment.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

I claim:

1. A method of separating and removing undesired solids from liquids found in aquaculture comprising the following steps, flowing a liquid stream from an aquaculture system with undesired solids into a sealed cylindrical tank, allowing the solids to settle into a conical bottom portion of the tank, flowing a clean stream of liquid out of the top of the tank through a down pipe, periodically ejecting accumulated solids from the conical bottom portion of the tank by introducing compressed air into the upper section of the sealed tank to stop the liquid flow into the tank and to form and expand an air plenum in the top of the tank which displaces the accumulated settled solids sludge out of the conical bottom portion of the tank through an overflow pipe that has an end located in the bottom portion of the tank, stopping the introduction of compressed air into the tank to stop the liquid flow through the overflow pipe, purging the air in the top of the tank and resuming the flow of the liquid stream from the aquaculture system.

2. The method of claim 1 including the step of, flowing air out of the tank at a high point in the tank at a rate substantially less than the flow rate of compressed air being introduced to the tank.

3. The method of claim 1 including the step of, flowing the clean stream of liquid from the down pipe by flowing air into a pipe connected to the down pipe having an upward flow of the clean liquid stream therein.

4. The method of claim 1 including the step of, floating a bed of slightly buoyant granular media in the upper portion of the cylindrical tank section to further stabilize the centrifugal flow pattern within the tank.

5. The method of claim 4 including the step of, using the compressed air introduced into the tank to agitate the granular media bed in order to scour internal tank surfaces during solids ejection.

6. The method of claim 1 including the step of, not using a polymer to enhance particle aggregation and settling.

* * * * *